United States Patent [19]

Anderson

[11] 4,133,514

[45] Jan. 9, 1979

[54] ENGINE HOIST ATTACHMENT FOR AUTOMOBILES

[76] Inventor: Gerald B. Anderson, 8291 23rd St., Westminster, Calif. 92683

[21] Appl. No.: 867,862

[22] Filed: Jan. 9, 1978

[51] Int. Cl.² ............................................. B60P 1/48
[52] U.S. Cl. ................................................ 254/124
[58] Field of Search ............... 254/2 R, 2 B, 8 R, 8 B, 254/124, 139.1, 89–91; 187/8.43

[56] References Cited

U.S. PATENT DOCUMENTS

| 3,048,237 | 8/1962 | Rutherford | 187/8.43 |
| 3,521,860 | 7/1970 | Zehrung et al. | 254/124 |

*Primary Examiner*—Robert C. Watson
*Attorney, Agent, or Firm*—Knobbe, Martens, et al.

[57] ABSTRACT

An engine hoist with a hydraulically powered lifting boom is attached to and used in combination with an automobile hoist.

9 Claims, 4 Drawing Figures

ENGINE HOIST ATTACHMENT FOR AUTOMOBILES

BACKGROUND OF THE INVENTION

This invention relates to an automobile engine hoist which utilizes a hydraulically powered boom and, more particularly, to the use of said hoist as an attachment to an automobile hoist such as is commonly found in gasoline service stations.

Generally, engine hoists are self-contained devices consisting of a large support structure and some type of lifting mechanism. The lifting mechanism, typically a chain and pulley apparatus, must supply the entire vertical lift necessary in removing the engine from an automobile. Once the engine is removed, its handling is a difficult task because of the immobility of the support structure and the awkwardness of operating the lifting mechanism. Furthermore, the large size and bulkiness of conventional engine hoists causes them to be expensive to purchase and difficult to store once acquired.

SUMMARY OF THE INVENTION

The present invention offers a simple yet unique solution to the problems presented by prior engine hoists. It consists of an attachment to a conventional automobile hoist, the combination being utilized in the efficient removal and replacement of automobile engines.

There are several advantages to using a conventional car hoist in combination with the engine hoist attachment of the present invention. First, such car hoists are usually present in service stations and car repair facilities. Their use in combination with an engine hoist attachment makes for the efficient use of a valuable and expensive existing asset. Secondly, such car hoists are easy to operate and obviously have very high lifting capacities. Since, in the present invention, they are used to perform general lifting functions, the engine hoist attachment need only provide small vertical displacements which can be more accurately controlled. In addition, the arms pivotally mounted on conventional car hoists facilitate the attachment of the present invention and provide for the easy handling of automobile engines. Further, the use of the larger hoist obviates the need for a large and costly support structure or a clumsy chain-pulley lifting mechanism. Therefore, the engine hoist of the present invention is a more compact, efficient and inexpensive device than conventional hoists.

The engine hoist attachment of the present invention consists of a base, securely mounted on one arm of the automobile hoist, and a lifting boom, pivotally mounted on the base. A hydraulic jack resting near the end of the car hoist arm is attached to the underside of the boom. This jack provides lifting power to the boom and makes possible the achievement of small vertical displacements necessary to efficiently remove an automobile engine while avoiding damage to the hoist, engine or car. Attached to the end of the lifting boom is a chain designed to receive the engine and securely hold it during the lifting process. Adjustability of the boom length is accomplished by utilizing two steel square tubes, one slidably fitting within the other.

In summary, an important advantage of the present invention is the use of an automobile hoist to obtain large lifting displacements. Besides providing for the efficient use of the automobile hoist itself, its utilization means that the engine hoist attachment can be less expensive, more compact, and therefore easier to handle and store. At the same time, however, efficiency is not sacrificed because of the precise lifting capabilities achievable with the hydraulic jack.

Because of its independent lifting capabilities, the engine hoist attachment of the present invention is a versatile device which can perform a variety of lifting functions. For example, it can be modified to be attachable to various bases other than an automobile hoist, and yet still maintain substantial lifting capabilities.

These and other advantages of the present invention are readily apparent by reference to the drawings in which.

DETAILED DESCRIPTION OF THE PREFERRED EMBODIMENT

Figure 1:
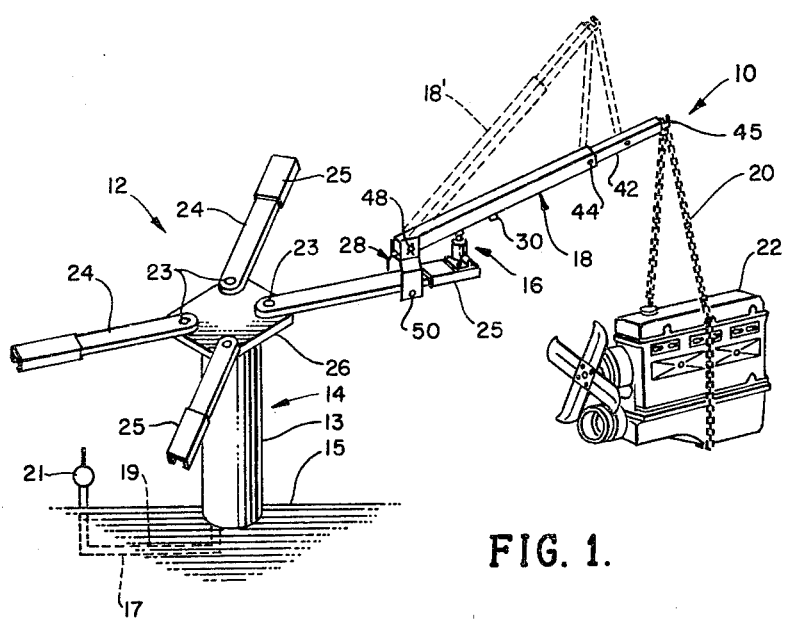
FIG. 1 is a perspective drawing of the engine hoist attachment of the present invention, as attached to a conventional automobile hoist.

As shown in FIG. 1, the engine hoist attachment of the present invention, indicated generally at 10, is attached to a conventional automobile hoist, indicated generally at 12. The present invention achieves large vertical displacements via column 14 of the automobile hoist 12. Precise displacements are obtained through a hydraulic jack 16 of the engine hoist attachment 10. Such displacements are transmitted through a lifting boom 18 and chain 20 to lift an automobile engine 22. The displaced position of the boom 18 is shown at 18'. The automobile hoist is of the type conventionally used in service stations and includes a vertical column 13 which is mounted in the floor 15 and selectively raised and lowered axially by hudraulic or pneumatic power the controls for which are shown schematically as conduits 17 and 19 and manually operable valve 21. The power and controls for the hoist 12 use conventional techniques. The column 13 is shown in the raised position and can be held in position at any elevation between its bottom and top positions. At the top of the column 12, four arms 24 are mounted on a head 26. The connection between each arm 24 and the head 26 is a vertical pivot pin 23 which permits the arm to pivot about a vertical axis under manual urging. At the end of each arm is a plate 25 which can be manually slid along its respective arm 24 to effectively lengthen or shorten the arm.

The hoist as described so far is well known and is found in most service stations. In its conventional operation, the valve 21 is operated to lower the column 13 so that the head 26 essentially rests on the floor 15. An automobile is then positioned over the hoist. The arms 24 are pivoted and the plates 25 slid along the arms to position each plate under a frame member of the automobile and so that the automobile will be stable when lifted. The valve 21 is then operated to raise the column 13 so that the plates 25 engage the automobile frame, and raise it until the automobile is at the desired height for working on the underside, at which position it is retained. After work is completed the valve 21 is operated to lower the column so that the automobile can be driven off.

While the hoist column 14 can be raised and lowered a substantial distance, e.g. six or seven feet, for access to the underside of the automobile, and can be stopped at intermediate positions as well as at top and bottom, it is not well suited to precisely controlled movement for a few inches or less. Instead, it provides high power lifting with a relatively long stroke, but little sensitivity.

Figure 2:
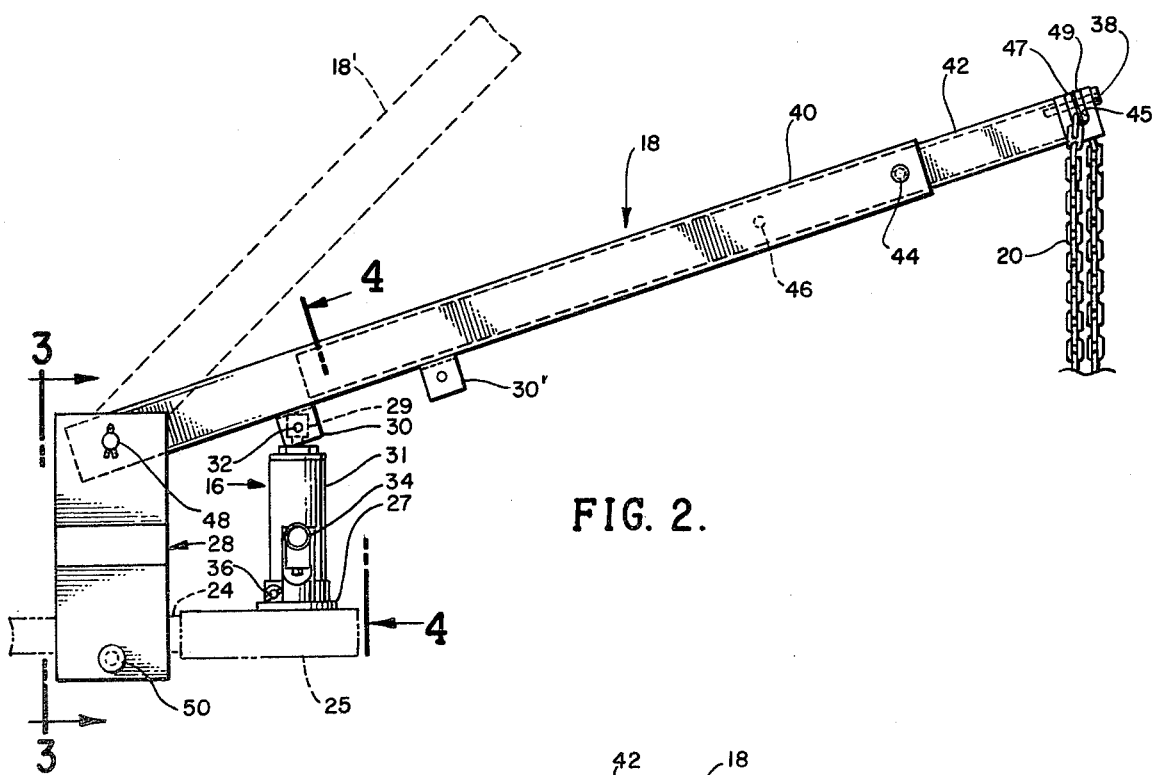
FIG. 2 is a side view of the engine hoist attachment, showing base, lifting boom and hydraulic jack.
Figure 3:
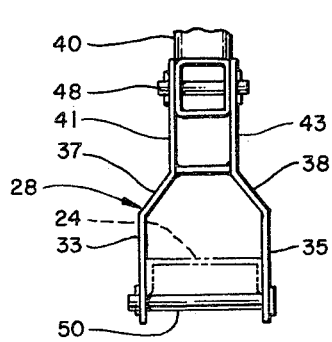
FIG. 3 is a section view, taken along lines 3—3, of the engine hoist base showing the manner of its attachment to an arm of the automobile hoist.
Figure 4:
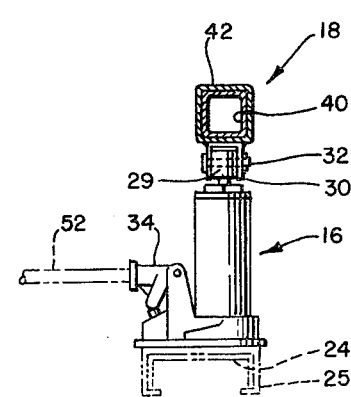
FIG. 4 is a section view, taken along lines 4—4, showing the details of the hydraulic jack lifting apparatus.

The engine hoist attachment 10 is attached to one of the four pivotal arms 24. Referring to FIGS. 2-4, a conventional hydraulic jack 16 is mounted on the plate 25. The base 27 of the jack may just rest on the plate 25. The jack includes a lifting rod and head 29, a crank connector 34 for receiving a crank handle 52 and a release valve 36. As noted above this is merely intended to be representative of a conventional, well known hydraulic or pneumatic jack of the type commonly used to raise one or two wheels of an automobile, e.g. to change a tire. As is well known the crank handle 52 is pumped up and down to raise the head 29 under hydraulic power from conventional mechanism within the body 31.

The lifting boom 18 consists of two telescoping square tubes 40 and 42. The outer tube 40 has a bracket 30 on its underside which is connected to the jack head 29 by a removable pin 32. The inner tube 42 is locked in a selected one of a plurality of extended positions by a removable locking pin 44. Thus, the overall length of the boom can be adjusted by removing the pin 44, sliding the inner tube 42 outward or inward and re-inserting the pin 44 so that it extends through the pin hole in the outer tube and a selected one of a plurality of compatible holes 46 in the inner tube 42.

The yoke 28 which connects the boom 18 to the arm 24 includes a pair of side plates 33, 35 disposed on opposite sides of the arm 24. A bolt 50 extends through the sides of the yoke 28 and under the arm 24 to prevent the yoke 28 from lifting from the arm. Although the side plates 33, 35 are shown butting against the sides of the arm 24, actually they can be considerably further apart than the width of the arm permitting use with arms of various widths. The side plates 33, 35 converge inwardly a few inches above the arm 24 at 37, 39 to limit downward movement of the yoke 28 on the arm. It will be noted that the distance between the bolt 50 and the converging sides 37, 39 may be greater than the height of the arm 24 to permit use of the attachment with arms of various heights. The weight of the boom holds the arm 24 firmly against the bolt 50 even if the arm 24 is considerably narrower and shorter than the space in the yoke in which it fits.

Above the converging portions 37, 39, the side plates have spaced vertical portions 41, 43 which extend on opposite sides of the outer tube 40 of the boom. A pivot pin 48 pivotally connects the boom to the bracket 28.

The outer end of the boom inner tube 42 has a slot 45 which receives the two end links 47, 49 of the chain 20 used to lift the engine 22. A pin 38 extends through the end lengths 47, 49 and retains the chain in the slot.

The atttachment can be easily put on and removed from the main hoist and is easy to store when off. In order to put the attachment on, the bolt 50 is removed from the yoke, and the jack 16 with the boom 18 and yoke 28 attached is placed on the arm 24. The bolt 50 is then inserted and the device is ready to use. Similarly, the entire attachment can be removed merely by removing the bolt 50 and lifting the attachment off. Thus, the existing main hoist can be used normally for its conventional prupose of lifting automobiles, but quickly converted for use in pulling engines.

In operation, if an engine is to be installed in an automobile, the engine is placed on the floor adjacent the end of the boom 18. The jack 16 may be raised to near its top position. The chain is wrapped around the engine and hooked. The main hoist 12 is then raised by operation of valve 21 until the engine is above the automobile fender. The arm 24 to which the attachment is connected is then manually pivoted about its pin 23 to approximately position the engine over the engine mounts in the automobile. The main hoist 12 is then lowered, while the arm 24 is pivoted until the engine is a few inches from the mounts. The main hoist is then held in that position and the jack 16 is lowered slowly, while manually swinging the engine on the chain to precisely position it and set it gently on the engine mounts. With the engine in place the chain can be unhooked.

To remove an engine from an automobile the jack 16 is put in its lowered position, the arm 24 is swung so the boom is over the engine, and the main hoist 12 is lowered until the chain can be connected around the engine and hooked. If necessary, the boom is extended or retracted by changing the hole for pin 44, and the arm is swung until the boom end is centered over the engine. In this manipulation, the play in the base 28 because of the side plates 33, 35 being higher than the arm thickness permits some vertical movement of the boom 18.

With the chain hooked, the jack 16 is raised to free the engine from the mounts and adjacent automobile parts. The main hoist 12 is then raised to pull the engine from the automobile.

A second bracket 30' like the bracket 30 is provided. By sliding the yoke 28 along the arm the head 29 can instead be connected to bracket 30'; which increases the mechanical advantage at a comensurate sacrifice in available boom movement.

I claim:

1. A hoist for lifting automobile engines to and from automobiles and the like comprising:
   a floor;
   a main hoist permanently mounted in the floor;
   said main hoist including a vertically reciprocable column with engaging means at its upper end for engaging under the frame of an automobile;
   said engaging means comprising a plurality of arms mounted on said main hoist for pivotal movement about a vertical axis;
   first power means for raising said main hoist to raise an automobile on said engaging means from the floor sufficiently to work under it;
   a removable attachment selectively mountable on said engaging means for lifting a heavy object, said attachment being mounted on one of said arms;
   said attachment moving with said main hoist but including lifting means moveable relative to said main hoist;
   second power means for moving said lifting means relative to said main hoist;
   said first power means being relatively insensitive to small movements but permitting a relatively large movement of said main hoist and the lifting means therewith for gross movement of the object to be lifted; and
   said second power means being relatively sensitive to small movements for precisely positioning the object to be lifted.

2. A hoist for lifting automobile engines to and from automobiles and the like comprising:
   a floor;
   a main hoist permanently mounted in the floor;
   said main hoist including a vertically reciprocable column with engaging means at its upper end for engaging under the frame of an automobile;
   first power means for raising said main hoist to raise an automobile on said engaging means from the floor sufficiently to work under it;
   a removable attachment selectively mountable on said engaging means for lifting a heavy object;
   said attachment moving with said main hoist but including lifting means moveable relative to said main hoist;
   said lifting means comprising:
      a jack mounted on said main hoist;
      a boom connected to said main hoist and to said jack to serve as a lever for lifting said object relative to said main hoist;
   second power means for moving said lifting means relative to said main hoist;
   said first power means being relatively insensitive to small movements but permitting a relatively large movement of said main hoist and the lifting means therewith for gross movement of the object to be lifted; and
   said second power means being relatively sensitive to small movements for precisely positioning the object to be lifted.

3. A hoist in accordance with claim 2 and further comprising:
   a yoke removably connected to said main hoist and pivotally connected to one end of said boom;
   means at the other end of said boom for connection to the object to be lifted; and
   said jack being connected to said boom intermediate its ends.

4. A hoist in accordance with claim 2 wherein said boom comprises a pair of elongate telescoping members for adjusting the boom length.

5. A method of lifting a heavy object such as an automobile engine comprising:
   attaching to a pre-installed automobile hoist of a type conventionally used for raising automobiles, a secondary smaller hoist moveable with said automobile hoist and also moveable under power independent of said automobile hoist, said smaller hoist being attached to an arm which is mounted on said automobile hoist for movement about a vertical axis;
   attaching to said secondary hoist, means for engaging the heavy object, and lifting it responsive to lifting of either said automobile hoist or said secondary hoist; attaching said engaging means to said object;
   selectively providing power to said automobile hoist for positioning said object at approximately its desired height;
   pivoting said arm about said vertical axis to position said object; and
   selectively providing power to said secondary hoist for precisely positioning said object at its desired height.

6. A hoist for automobile engines or the like comprising:
   a vertical column;
   a horizontal arm mounted on said column, said arm being pivotal about a vertical axis;
   a base mounted on said arm;
   an elongate boom having one end connected to said base for pivotal movement about a horizontal axis;
   means at the other end of said boom for engaging an engine;
   a jack mounted on said arm and connected to said boom intermediate its ends; and
   power means for operating said jack to raise and lower said boom.

7. An attachment for connection to an arm for hoisting automobile engines and the like comprising:
   an elongate boom having two ends;
   means at one end of the boom for connection to an engine to be lifted;
   a jack connected to said boom intermediate its ends, said jack having a base adapted to rest on an arm;
   a yoke pivotally connected to the other end of said boom, said yoke having an opening adapted to receive therethrough the arm on which the jack rests;
   a readily removable fastener extending through said yoke and defining the bottom of said opening to retain said boom on the arm.

8. An attachment in accordance with claim 7 in combination with an arm which extends through the opening in said yoke and on which said jack base rests, said arm being considerably smaller in cross-section than said opening through said yoke.

9. An attachment and arm combination as defined in claim 8 wherein said fastener is the only element preventing lifting of the attachment from said arm and the weight of said boom holds said jack on said arm.

* * * * *